(12) United States Patent
Pati et al.

(10) Patent No.: US 12,639,118 B2
(45) Date of Patent: May 26, 2026

(54) MANAGING CURRENT CONSUMPTION IN A MACHINE LEARNING ACCELERATOR

(71) Applicant: SiMa Technologies, Inc., San Jose, CA (US)

(72) Inventors: Vishvabhusan Pati, Sunnyvale, CA (US); Saurabh Jain, San Jose, CA (US); Srivathsa Dhruvanarayan, Saratoga, CA (US); Chia-Hsin Chen, San Jose, CA (US)

(73) Assignee: SiMa Technologies, Inc., San Jose, CA (US)

( * ) Notice: Subject to any disclaimer, the term of this patent is extended or adjusted under 35 U.S.C. 154(b) by 142 days.

(21) Appl. No.: 18/620,428

(22) Filed: Mar. 28, 2024

(65) Prior Publication Data

US 2025/0307007 A1    Oct. 2, 2025

(51) Int. Cl.
*G06F 9/50* (2006.01)
*G06F 1/08* (2006.01)
*G06F 9/54* (2006.01)

(52) U.S. Cl.
CPC .............. *G06F 9/5027* (2013.01); *G06F 1/08* (2013.01); *G06F 9/54* (2013.01); *G06F 2209/508* (2013.01); *G06F 2209/543* (2013.01)

(58) Field of Classification Search
CPC .............. G06F 9/5027; G06F 1/08; G06F 9/54
USPC ......................................................... 713/322
See application file for complete search history.

(56) References Cited

U.S. PATENT DOCUMENTS

| | | | | |
|---|---|---|---|---|
| 4,646,236 A | * | 2/1987 | Crockett ................... | G06F 9/28 |
| | | | | 712/E9.008 |
| 5,764,531 A | * | 6/1998 | Kojima ................. | G06F 30/327 |
| | | | | 716/113 |
| 6,583,648 B1 | * | 6/2003 | Cai ........................ | G06F 1/3237 |
| | | | | 327/295 |
| 7,219,245 B1 | * | 5/2007 | Raghuvanshi ........ | G06F 1/3296 |
| | | | | 713/340 |
| 7,456,613 B2 | * | 11/2008 | Uesaka .............. | G01R 31/3842 |
| | | | | 320/132 |
| 8,032,678 B2 | * | 10/2011 | Tardieux ............... | G06F 13/362 |
| | | | | 710/113 |
| 9,928,460 B1 | * | 3/2018 | Nowatzyk .............. | G06N 3/045 |
| 12,443,000 B2 | * | 10/2025 | Winterbottom ....... | G02F 1/0123 |
| 2002/0138777 A1 | * | 9/2002 | Feierbach ............. | G06F 9/3867 |
| | | | | 712/E9.071 |
| 2010/0150271 A1 | * | 6/2010 | Brown ............... | H03K 19/0016 |
| | | | | 375/324 |
| 2011/0106992 A1 | * | 5/2011 | Lee ......................... | G06F 1/324 |
| | | | | 710/110 |

(Continued)

*Primary Examiner* — Paul R. Myers
(74) *Attorney, Agent, or Firm* — Fenwick & West LLP

(57) ABSTRACT

Current surge is managed by estimating the current demand based on the actual instructions being executed and then adjusting the clock for the static schedule. For statically scheduled instructions, the compute elements synchronously execute the instructions according to the static schedule. The synchronization is provided by a common clock that is used to clock the instruction execution by the compute elements. As instructions are being executed, their current consumption may be estimated based on the type of instruction. The current consumptions for the instructions executed by the compute elements may be aggregated, providing an estimate of the aggregate current demand. This can then be used to adjust the clock accordingly.

20 Claims, 8 Drawing Sheets

170 MLA

(56)          References Cited

U.S. PATENT DOCUMENTS

| | | | |
|---|---|---|---|
| 2012/0011504 A1* | 1/2012 | Ahmad ................... | G06F 12/08 |
| | | | 718/1 |
| 2014/0122916 A1* | 5/2014 | Garcia ................... | G06F 1/324 |
| | | | 713/503 |
| 2015/0082060 A1* | 3/2015 | Persson ................ | G06F 1/3203 |
| | | | 713/300 |
| 2018/0102251 A1* | 4/2018 | DeLacruz .............. | H01L 24/02 |
| 2019/0163229 A1* | 5/2019 | Fahim .................... | G06F 1/324 |
| 2021/0110187 A1* | 4/2021 | Pillai ..................... | G06N 5/022 |
| 2021/0174181 A1* | 6/2021 | Huang ................... | G11C 11/54 |
| 2021/0312320 A1 | 10/2021 | Shah et al. | |
| 2021/0319307 A1 | 10/2021 | Dhruvanarayan et al. | |
| 2023/0031537 A1* | 2/2023 | Choudhury ........... | G06N 3/045 |
| 2025/0212291 A1* | 6/2025 | Alfarhan .............. | H04L 5/0091 |

* cited by examiner

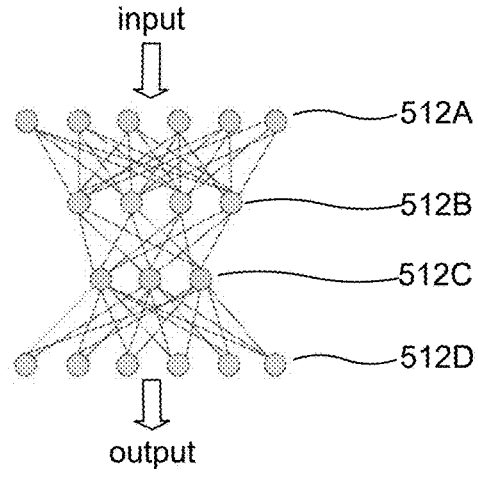

500 Machine Learning Network
- Architecture (layers, nodes, interconnections, operators applied at nodes)
- Parameters (values of weights, biases, parameters for operators)

520 ML Compiler
- Instruction set
- Known execution duration of instructions
- Known MLA topology 550 Computer Program
- Instructions implement MLN on MLA
- Allocation of computations to PEs
- MLA instructions are statically scheduled.

570 Machine Learning Accelerator (MLA)
- Mesh of PEs + SEs
- PEs execute instructions
- Data transfer paths between PEs and SEs

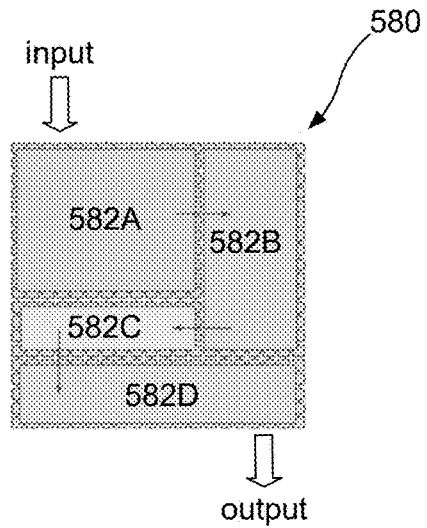

FIG. 5A

MANAGING CURRENT CONSUMPTION IN A MACHINE LEARNING ACCELERATOR

BACKGROUND

1. Technical Field

This disclosure relates generally to the implementation of machine learning networks on hardware and more particularly to managing current consumption in synchronized compute elements that execute statically scheduled instructions.

2. Description of Related Art

Machine learning is one of the most powerful recent trends in technology. In machine learning, a model is developed to perform a certain task. The model, which will be referred to as a machine learning network, is trained and deployed in order to carry out that task. For example, a model may be developed to recognize the presence of objects within images captured by a set of cameras. Once the model is deployed, images captured by the cameras are input to the machine learning network, which then outputs whether or to what confidence level objects are present within the images.

Machine learning networks typically require the handling of a large volume of data and the execution of a large number of computations. As a result, they are commonly implemented in compute facilities with access to significant resources, such as in the cloud or on server clusters. There can be many advantages if the machine learning network was instead embedded on edge devices, such as combined in a camera system. However, many types of edge devices, such as cameras, have resource limitations. They may be limited in memory, processing capability, power consumption, etc. As a result, on-chip compute elements may be simplified to conserve resources.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 5A is a block diagram of a system with a MLA and corresponding compiler.

DETAILED DESCRIPTION OF THE PREFERRED EMBODIMENTS

Figure 1:
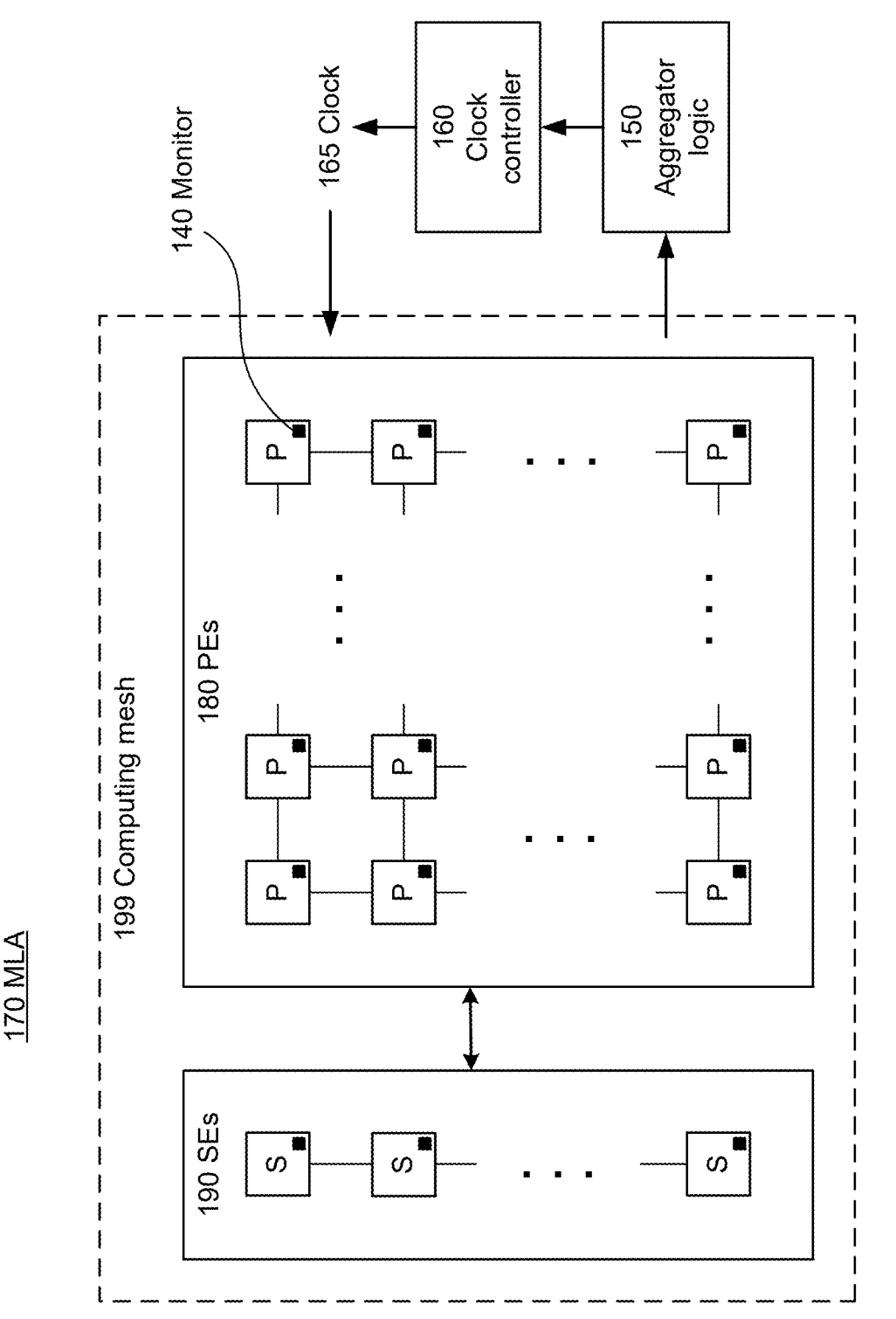
FIG. 1 is a block diagram of a machine learning accelerator (MLA) with digital power control.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Machine learning networks (MLNs) are commonly implemented in compute facilities with access to significant resources, such as in the cloud or on server clusters. However, the sources of input to machine learning networks may be located remotely from these large compute facilities. For example, cameras and other types of sensors may be edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time. In addition to memory and other programmable processors, an edge device may also include sensors, such as cameras including both still image and video cameras, microphones, temperature sensors, pressure sensors and other types of sensors. The sensors may capture samples that are used as inputs to a computing pipeline within the edge device. Thus, it would be beneficial if MLNs could be implemented in edge devices.

A machine learning accelerator (MLA) is described herein that may be built into an edge device. The MLA executes a machine learning network. As described in more detail below, one method of optimizing execution of an MLN is to use a compiler that, prior to run-time, generates a computer program with statically scheduled instructions for executing the MLN. For example, the compiler may determine which instructions are executed by which compute elements in the MLA at what time. Static scheduling enables the compute elements in the MLA to execute the instructions with no run-time conditions, branching or dependencies. This may result in lower power consumption, simpler MLA design, and lower cost.

However, when the statically scheduled instructions are executed, a large number of hardware resources (e.g., compute elements) may be operating concurrently in a synchronous manner. While this provides a fast implementation of the MLN, the resources can consume a large amount of current causing a sudden demand to the power supply network. This is commonly referred to as rate of current change (or di/dt) surge.

A di/dt surge inside a chip such as an MLA puts a stress on the power supply and on the power delivery network. Sudden increases and decreases in current demand may lead to voltage overshoot and undershoot. The current surge may also cause a voltage drop in the supply, which is referred to as IR drop. The drop in the supply voltage not only reduces switching speed inside the chip but also reduces the noise margin of the circuits, possibly resulting in random flips in digital bits and functional failure. Current surges may also have indirect effects such as stress on metal tracks with long-term damage to the chip.

In the approach described in this disclosure, current surge is managed by estimating the current demand based on the actual instructions being executed and then adjusting the execution clock for the statically scheduled program. For statically scheduled instructions, the compute elements synchronously execute the instructions according to the static schedule. The synchronization is provided by a common clock that is used to clock the instruction execution by the compute elements. As instructions are being executed, their current consumption may be estimated based on the type of instruction. The current consumptions for the instructions executed by the compute elements may be aggregated, providing an estimate of the aggregate current demand. This can then be used to adjust the clock accordingly. For example, the clock frequency may be reduced or clock cycles may be dropped (chopped) in order to reduce or mitigate di/dt surge.

Since the MLA is designed to compute a large number of calculations quickly, the control loop for adjusting the clock may be simplified and implemented in hardware in order to ensure that it is fast enough. For example, the control loop may be implemented using digital circuits, such as lookup tables. For convenience, the clock adjustment capability will be referred to as digital power control.

FIG. 1 is a block diagram of a machine learning accelerator (MLA) with digital power control. The MLA 170 includes a mesh 199 of compute elements, which in this example includes interconnected storage elements (SEs) 190 and processing elements (PEs) 180. Within the computing mesh 199, data can be transferred between the SEs 190 and/or PEs 180 according to statically scheduled data transfer instructions. The PEs 180 perform computations according to statically scheduled compute instructions. These data transfer and compute operations within the mesh 199 are deterministic, meaning that the compiler may determine at compile time how many cycles are required to execute each instruction. As a result, these instructions may be statically scheduled by the compiler. They are then executed by the compute elements 180, 190 within mesh 199 according to the static schedule. The static schedule is timed by a common clock 165.

The MLA 170 also includes a real-time control loop from the compute elements 180, 190 to the clock signal 165. The control loop includes monitor circuits 140, aggregator logic 150 and a clock controller 160. The monitor circuits 140 are shown in FIG. 1 as small black squares, only one of which is labeled as 140. The monitor circuits 140 generate activity metrics for the compute elements based on instruction types of the instructions executed by the compute elements. The activity metric may be indicative of the current consumption for different types of instructions. In some implementations, each compute element includes a dedicated monitor circuit embedded in the compute element. The dedicated monitor circuit generates the activity metric for that compute element based on the actual instructions executed by that compute element.

The aggregator logic 150 receives the activity metrics from the monitor circuits and generates an aggregate activity metric from the individual activity metrics. In this example, the aggregate activity metric may be an estimate or indicator of aggregate current consumption by the compute elements of the MLA.

The clock controller 160 adjusts the clock signal 165 based on the aggregate activity metric. When there is an indication of current surge, the controller 160 reduces the effective clock frequency (EF) of the clock. This reduces the current consumption. The effective clock frequency is based on the average number of clock cycles available for timing the execution of instructions. One way to reduce the effective clock frequency is to reduce the actual clock frequency. For example, if a clock is operating at 10 GHz, then reducing the frequency by 10% results in a clock operating at 9 GHz with an effective clock frequency of 9 GHz. Another way to reduce the effective clock frequency is to reduce the number of available clock cycles, for example, by clock gating. If every tenth edge of the 10 GHz clock is chopped (eliminated) by clock gating, then the clock is still operating at 10 GHz but the effective clock frequency is 9 GHz.

The MLA 170 may use a fast clock 165 for timing the statically scheduled instructions, since faster clocks mean less time is required to execute an MLN. However, a fast clock also means that the control loop must be correspondingly fast in order to be effective. In one approach, fast speed is achieved by implementing the control loop entirely as digital circuitry. In addition, the various signals may be simplified to increase the overall speed. The activity metrics for individual compute elements may be bit-level signals, such as single-bit flags, rather than more complex floating point or integer numbers. These may be aggregated using simpler functions such as counting, rather than complex mathematical models. As a result, the control loop may be fast enough to operate in real-time. For example, the delay from when the monitor circuits receive instructions to when the clock is adjusted accordingly may be 32 clock cycles or 16 clock cycles or less. The delay may have a fixed component and a variable component. The fixed component may be programmable. For example, it may be selectable between 16 and 32 ns (at 1 ns clock-rate). The fixed component can be set to lower values for faster response. The variable component may be implementation dependent.

Figure 2A:
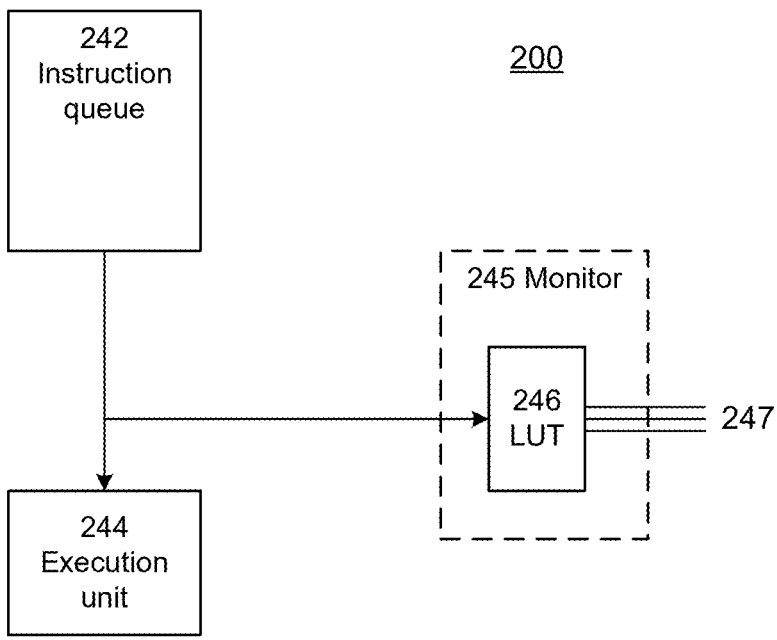
FIGS. 2A and 2B are block diagrams of a compute element with monitor circuit.
Figure 2B:
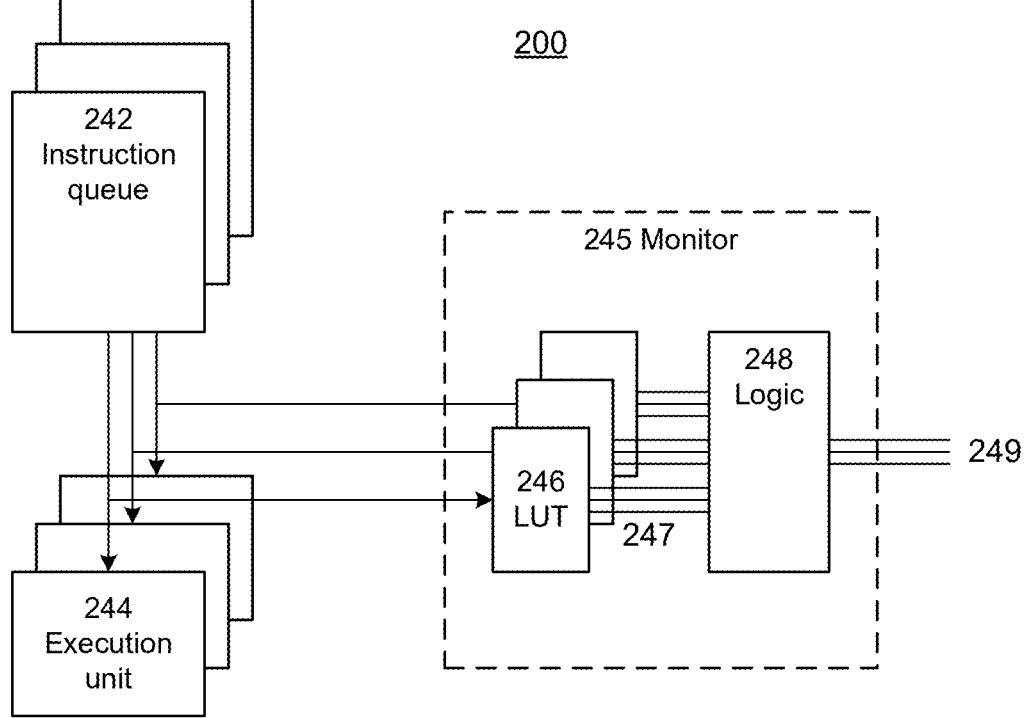
Figure 3:
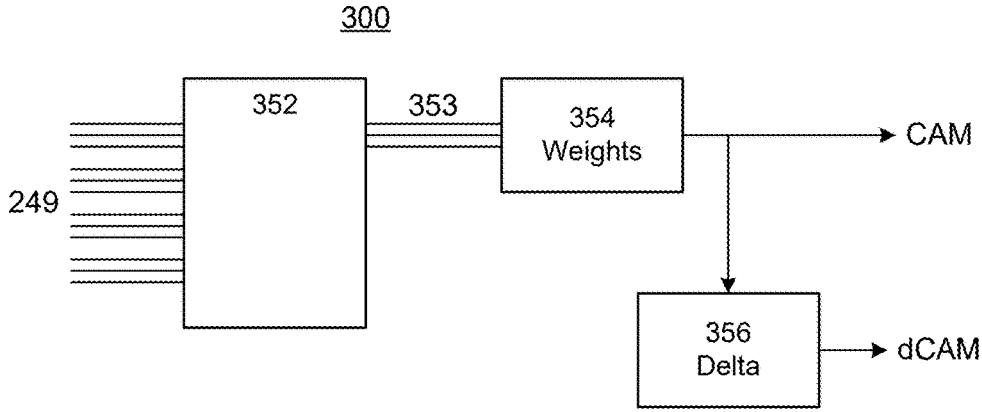
FIG. 3 is a block diagram of aggregator logic.
Figure 4:
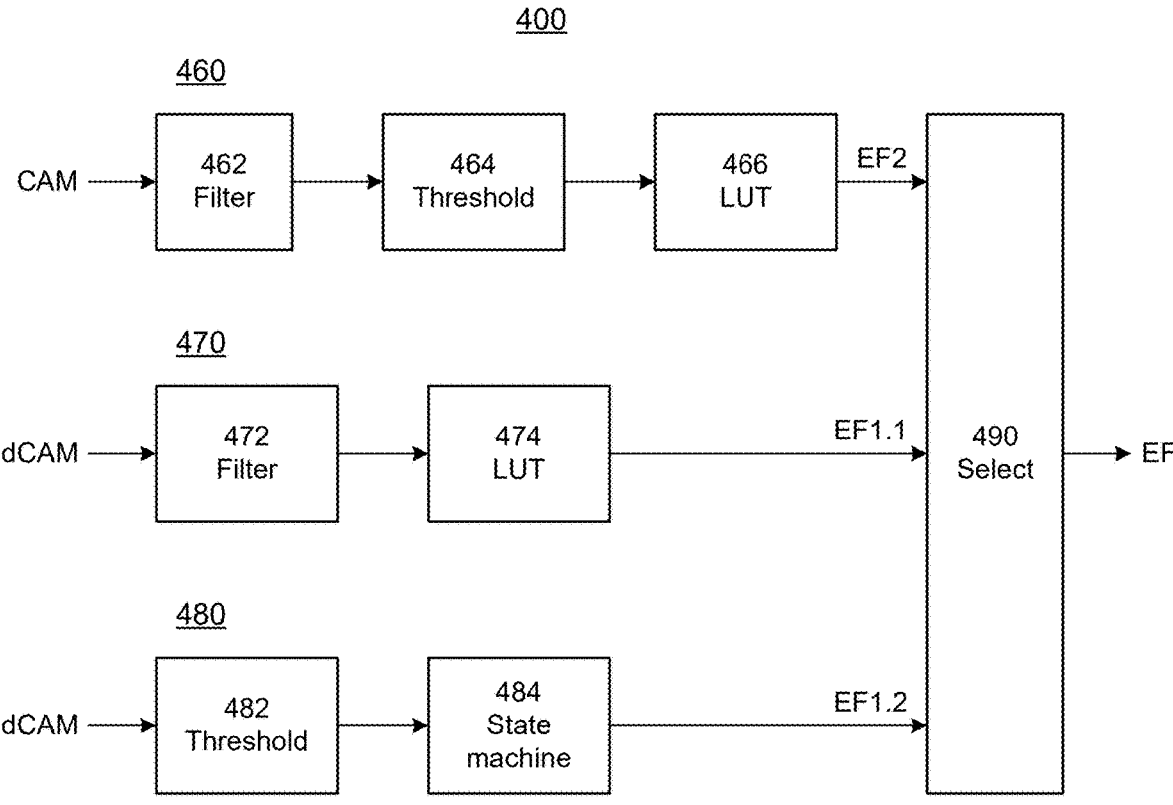
FIG. 4 is a block diagram of a clock controller.

FIGS. 2-4 are diagrams illustrating an example implementation of the digital power control. FIG. 2A is a block diagram of a compute element 200 with monitor circuit 245, which corresponds to element 140 in FIG. 1. The compute element includes an instruction queue 242, an execution unit 244, and a monitor circuit 245. The instruction queue 242 holds instructions to be executed by the execution unit 244 according to the static schedule. When instructions are transferred from the instruction queue 242 to the execution unit 244, they are also transferred to the monitor circuit 245. The monitor circuit 245 generates an activity metric 247 that indicates the current consumption of that instruction.

In the example of FIG. 2A, the activity metric is a set of three single-bit flags 247 for different activity levels: low activity, medium activity and high activity. The monitor circuit 245 includes a lookup table 246 that converts the received instruction to the corresponding activity level. For example, the lookup table 246 may use the opcode of the instruction as the index to the lookup table, classifying different instructions as low, med or high activity (i.e., low, med or high current consumption). In a different approach, the classifications may be memory access, low computation and high computation. Additional weight may be given for integer or floating-point arithmetic operators. Among the three flags 247, the flag for that activity level is set and may remain set for the duration of execution of that instruction.

The compute element may have multiple execution units 244, as shown in FIG. 2B. In FIG. 2B, the instructions for each execution unit 244 are converted to activity flags 247. Logic 248 aggregates these into a single activity metric 249 for the compute element. In this example, the activity metric 249 is also a set of single-bit flags for different activity levels: low activity, medium activity and high activity, but at the level of the compute element rather than for individual execution units. Because activity flags 247, 249 are all single bits, the logic 248 may be fairly simple and fast. In one approach, if multiple single-bit flags for a lower activity level are set, then those are aggregated to set a single-bit flag for a higher activity level. For example, if there are four execution units in a compute element, then three or more low activity flags may be promoted to a medium activity flag, and three or more medium activity flags may be promoted to a high activity flag.

This aggregation approach may be extended beyond the compute element. For example, rather than having a dedicated monitor circuit 245 for each compute element, the MLA may include one monitor circuit 245 (and set of activity flags 249) for a cluster of compute elements. The activity levels from all of the compute elements in the cluster may be aggregated to produce the activity flags 249 for the cluster.

FIG. 3 is a block diagram of aggregator logic 300, which corresponds to element 150 of FIG. 1. In this example, the aggregator logic receives the activity flags 249 from the monitor circuits and produces an aggregate activity metric that includes CAM and dCAM. CAM is a composite activity metric that is indicative of an aggregate current consumption of the compute elements. dCAM is a difference composite activity metric that is indicative of a rate of change of the aggregate current consumption of the compute elements.

The aggregator logic includes circuitry 352 which generates global indications 353 (aggregated over all compute elements) of the three activity flags. For example, these global activity metrics 353 may be counts of each activity flag. Circuitry 354 then combines these into a single metric, CAM. In one approach, the accumulated metrics 353 are subjected to programmable percentage weighting to generate the single metric CAM. The CAM is indicative of the current consumption of the compute elements of the MLA. Circuitry 356 generates the difference in CAM over a programmable window, referred to as dCAM.

FIG. 4 is a block diagram of a clock controller 400, which is element 160 of FIG. 1. In this example, the controller includes three branches 460, 470, 480, each of which produces an effective clock frequency, EF2, EF1.1 and EF1.2 respectively, in response to different effects.

Branch 460 reduces the effective clock frequency, when the aggregate activity level of the compute elements (CAM) is too large. This is current management in response to too high power consumption. Branch 460 includes a smoothing filter 462, threshold-comparator 464 and lookup table 466. The low pass filter 462 removes rapid variations, such as may be caused by memory accesses. Memory accesses can change every cycle. These changes are more rapid than is relevant. It is not necessary to adjust the clock on a cycle-by-cycle basis. Low pass filter 462 averages out these variations.

The threshold-comparator 464 determines when the filtered CAM is above an allowable threshold. Since CAM is an estimate of current consumption, this threshold is a max current or max power threshold. The lookup table 466 then provides the corresponding EF2 for the filtered CAM. In one approach, the lookup table 466 implements a step function with two thresholds T1 and T2, with T1<T2. If the filtered CAM is less than T1, then the effective clock frequency is not reduced. If the filtered CAM is between T1 and T2, then the effective clock frequency is reduced by some amount. If the filtered CAM is greater than T2, then the effective clock frequency is reduced by a larger amount.

This branch 460 addresses steady state power consumption. If the steady state power consumption is too high, then the effective clock frequency is reduced by this branch.

Branch 470 performs a similar function, but for dCAM and without the thresholding. This branch includes a smoothing filter 472, and lookup table 474. The purpose of smoothing filter 472 is the same as filter 462. The lookup table 474 then provides the corresponding effective clock frequency EF1.1 for the filtered dCAM. For a particular dCAM, the effective clock frequency can be reduced by an appropriate amount. This branch addresses slow variations (slower than for branch 480).

Branch 480 addresses "instantaneous" current increases. If the slope change (dCAM) is above a programmable threshold 482, a mechanism 484 is provided to reduce the effective clock frequency. This provides an immediate slow down of the clock on sudden jumps in slope. In this example, the mechanism is a state machine 484 that ramps down the clock gating ratio until a floor is reached and then ramps back up. The output of the state machine 484 is effective clock frequency EF1.2.

The three branches may be programmable. The filters, lookup tables, thresholds and state machine may be software programmable to provide additional flexibility.

Selection logic 490 combines the three effective clock frequencies EF1.1, EF1.2 and EF2 to provide a final effective clock frequency EF. In one approach, the selection logic 490 first selects the lower of EF1.1 and EF1.2. This result is then reduced by the EF2 amount (if any) to generate the final EF. The overriding backoff of EF2 provides a way to limit the peak clock frequency, in effect limiting the maximum dynamic power consumption.

Figure 5B:
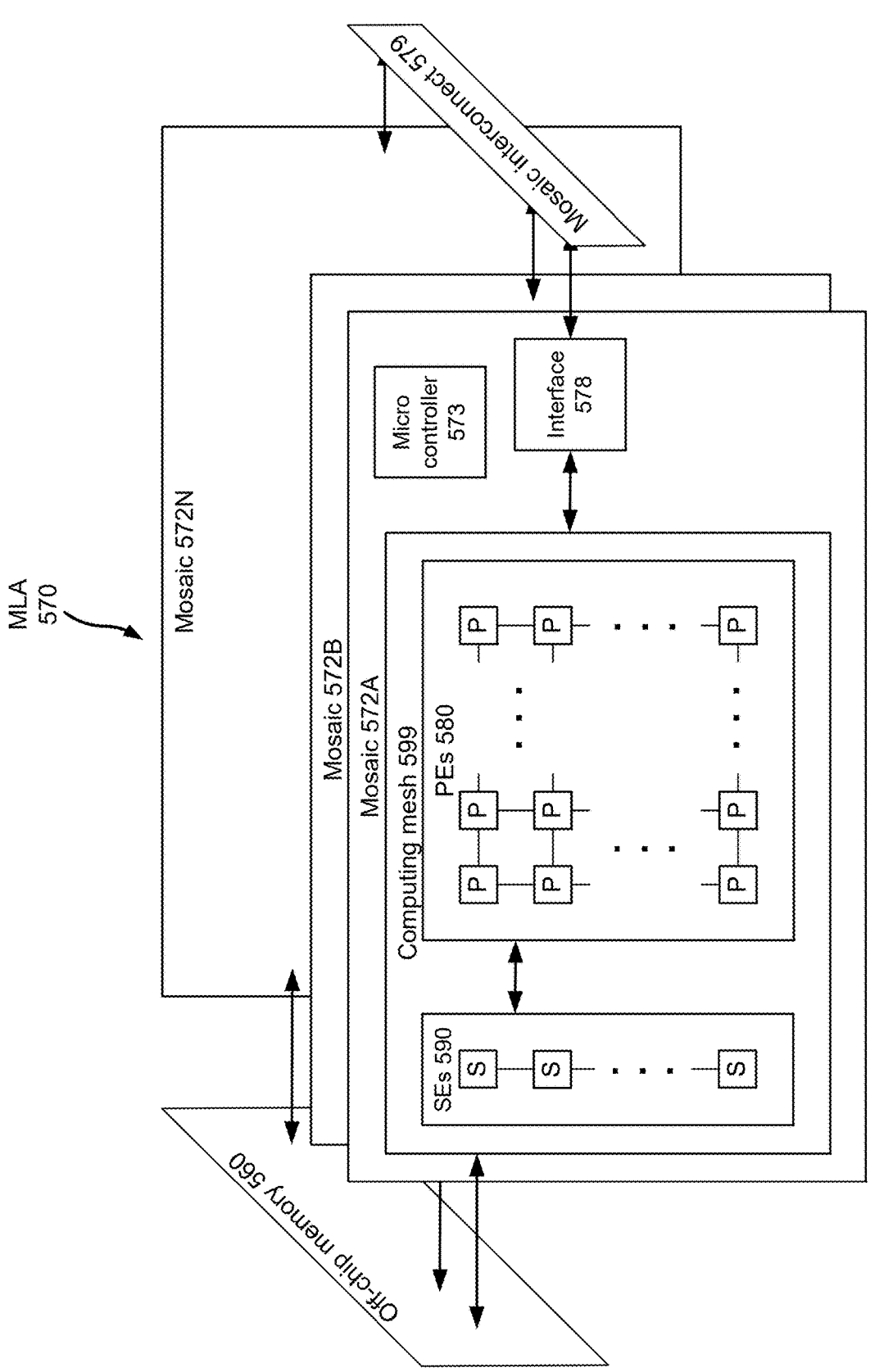
FIG. 5B is a block diagram of a hardware system including an MLA.
Figure 5C:
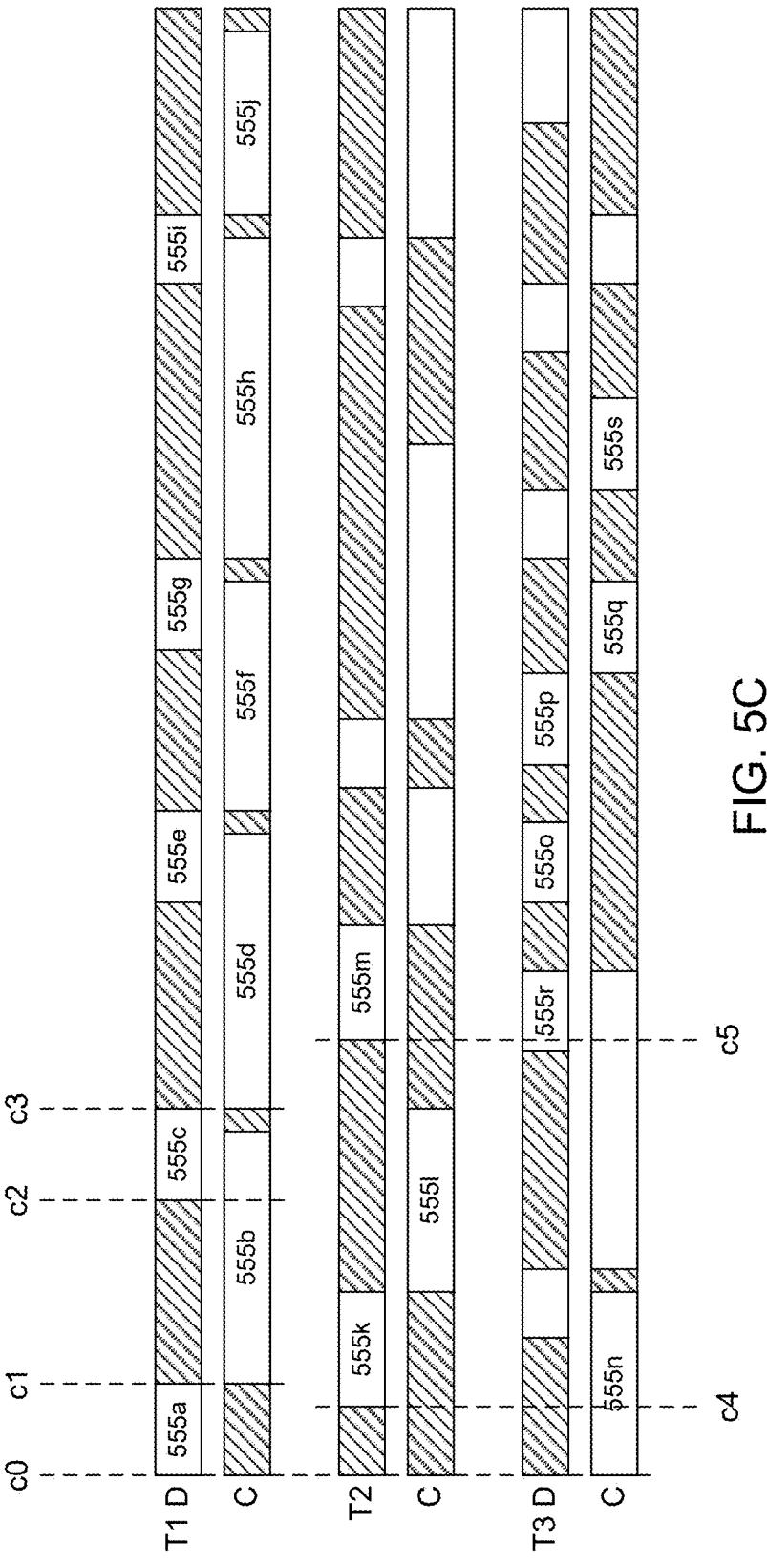
FIG. 5C illustrates execution of a statically scheduled program produced by a compiler.

FIGS. 5A-5C are more detailed descriptions of an example system that executes a statically scheduled program, as may be used with the techniques described above. FIG. 5A is a block diagram of a system with a MLA and corresponding compiler. The MLA may be part of an edge device. The compiler 520 receives a description of a machine learning network 500 and generates a computer program 550 that implements the machine learning network using MLA 570. The computer program 550 includes instructions that are executed by processing elements (Tiles) and/or storage elements (on-chip memory) in the MLA according to a schedule determined by the compiler. Certain instructions may be statically scheduled with respect to each other, because the compiler can determine which instructions are executed by which compute elements at what times. For statically scheduled instructions, there are no conditions, branching or data dependencies that can be resolved only at run-time, and which would affect the timing and order of the execution of the instructions.

Note that the static schedule determined by the compiler may or may not be included as part of the instructions and computer program. In some embodiments, the computer program may expressly include the schedule, specifying that instruction A is executed at cycle X, instruction B is executed at cycle X+4, instruction C is executed at cycle X+12, etc. In alternate embodiments, the computer program may specify only that instruction A is executed, followed by instruction B, and then instruction C, but without any scheduling information. Even though the static schedule is not expressly specified, these instructions will still execute according to the static schedule determined by the compiler because the compiler knows how long it takes to execute each instruction. As a result of the static scheduling, the MLA and instruction set for the MLA may be simplified, with the complexity offloaded to the compiler. A simpler MLA can result in lower cost, lower power consumption and higher performance, all of which are desirable for implementation in edge devices.

In more detail, the MLN 500 may be described by an architecture and parameters. A depiction of an MLN is shown to the right of box 500 in FIG. 5A. Most MLNs include multiple layers 512, each with one or more nodes which are represented by circles in FIG. 5A. The lines between nodes in FIG. 5A represent interconnections between the nodes and layers. Each node calculates a weighted sum of the values received from its connected nodes, possibly also applying a bias. Examples are matrix multiplication and convolution. Each node may also apply certain functionality or operators, such as nonlinear functions (e.g., tanh function), softmax operator, etc. A typical node may compute an output:

$$y = F(\Sigma w_i x_i + b) \tag{1}$$

where $x_i$ are the inputs received from other nodes i, $w_i$ are weights, b is a bias and F( ) is a nonlinear operator. The MLN architecture includes the number of nodes and layers and their interconnectivity, and the operators applied at nodes. The operators may be described in a parameterized form. The MLN parameters include the weights, biases, and parameters for the operators.

MLNs may vary in size, depending on the desired task. Small MLNs may have 5-10 or fewer layers, medium size MLNs may have 30-50 layers, and large MLNs may have 200 or more layers. Examples of inputs include text, images and video. Some of the layers may be fully interconnected where every node in one layer provides input to every node in the next layer. Others may be more locally interconnected, for example to implement convolutions. Each weighted interconnect represents a scalar multiplication. The total number of scalar multiplications required to implement an MLN may be on the order of millions, billions, tens of billions or even more. These may be carried out by matrix multiplications.

The MLA 570 includes many Tiles 580 and an on-chip memory system with storage elements (not shown in FIG. 5A) implemented on a semiconductor die. The Tiles are organized into one or more meshes of interconnected Tiles. A depiction of a Tile mesh is shown to the right of box 570 in FIG. 5A. In this example, the Tiles 580 are organized in a regular pattern and the interconnections within each mesh provide data transfer paths between Tiles in the mesh. The Tiles execute computations according to instructions received by the Tiles and using data stored in the on-chip memory system. These instructions may be for computations and/or for data transfer. Computations include multiply (including matrix multiply), add, and operators (e.g., nonlinear functions, lookup table, min/max, pooling). These are computations that implement the MLN. In the example of FIG. 5A, the computations performed by layers 512A-D are allocated to groups 582A-D of Tiles as indicated. The allocation is not required to be 1:1. For example, multiple layers could be allocated to a single Tile or vice versa. Not every computation required to implement an MLN need be executed by a Tile; some computation may be executed outside the MLA (e.g., floating point operations, if the Tiles only do integer arithmetic). Tiles typically will at least perform matrix multiplication.

The compiler 520 receives a description of the MLN 500 and generates a computer program 550 that implements the MLN using the MLA 570. The computer program 550 receives an input sample for the MLN and executes the operations of the MLN to produce the output for the MLN. The computer program 550 includes instructions to be executed by the Tiles for implementing computations in the MLN and may also include instructions to be executed by other elements, such as the storage elements of the on-chip memory or a controller outside the Tiles. For additional examples and description of the MLA and related components, see U.S. application Ser. No. 16/840,216, "Machine Learning Network Implemented by Statically Scheduled Instructions, with Compiler," which is incorporated by reference herein in its entirety.

The program of statically scheduled instructions may include a series of computations required to implement a portion of the MLN, where the time required for each computation and associated data transfers is known. As a result, the compiler may statically schedule these instructions. The resulting computer program produced by the compiler then implements an allocation of compute instructions to Tiles and a schedule for executing the instructions as determined by the compiler, although these may not be expressly contained with the computer program.

Non-deterministic instructions (i.e., instructions that are not statically scheduled) may also be used. For example, non-deterministic instructions may include data fetch and instruction fetch from off-chip memory where the time required to execute the operation varies too much to allow reliable synchronization with other operations. Other examples include computations that occur off-chip, and conditions, branching and other programmatic constructs that depend on values not known until run-time.

FIG. 5B is a block diagram of a hardware system including an MLA 570. The MLA 570 includes all the components shown in FIG. 5B, except the off-chip memory 560. The MLA components are implemented on a single die as part of a single chip. The MLA 570 includes one or more mosaics 572A-N. In this example, all of the mosaics are the same. Each mosaic 572 includes a computing mesh 599 that includes processing elements (PEs or Tiles) 580 and storage elements (SEs) 590. Each mosaic 572 also includes a controller 573. In FIG. 5A, the overall memory system is a multi-level memory system, which includes a level 1 (L1) memory distributed within the Tiles, a level 2 (L2) memory of SEs 590 which is shared by the Tiles, and the off-chip memory 560. If there are multiple mosaics 572, the MLA 570 may include a dedicated interconnect 579 for connecting the different mosaics. Each mosaic also includes an interface 578 to the interconnect 579. In FIG. 5B, The SEs 590 handle data transfer to and from the off-chip memory 560. The PEs 580 receive instructions from the off-chip memory 560. For convenience, the interface to off-chip memory 560 is not shown in FIG. 5B.

FIG. 5C illustrates execution of a statically scheduled program produced by a compiler. This example shows only instructions executed by PEs (Tiles) but the statically scheduled program typically also includes instructions executed by SEs. Execution of the static schedule begins at some time when all of the Tiles are synchronized, which for convenience is marked as cycle c0 in FIG. 5C. An external controller may synchronize the Tiles and start execution of the statically scheduled program when all Tiles are ready.

The example instructions shown in FIG. 5C are executed by three Tiles, as denoted by T1, T2 and T3. Each Tile has two pipelines: a "D" pipeline for executing data transfer instructions and a "C" pipeline for executing compute instructions. The row labeled T1 D shows instructions executed by the Tile 1 D (data transfer) pipeline, and the row labeled T1 C shows instructions executed by the Tile 1 C (compute) pipeline. For this example, assume that all the data transfer instructions are instructions that load new data into that Tile for consumption by the compute pipeline. The white regions of each row denote the execution of instructions and the hashed regions indicate that the pipeline is idling or executing a NO-OP (no operation).

For Tile 1, instruction 555a transfers data into Tile 1 from either another Tile or from ones of the SEs, and instruction 555*b* then performs a computation that consumes that data. Instruction 555*b* is dependent on instruction 555*a*. Here, the T1 C pipeline is not required to continuously poll the T1 D pipeline at run-time for when the data is available, and run-time message passing between the pipelines is not required to indicate that the data is available. Rather, because the duration (i.e., time required to execute) of instruction 555*a* is known, the compiler knows when the data will be available (for convenience, marked as cycle c1 in the figure) and can construct a static schedule in which instruction 555*b* starts execution then. The duration of instruction 555*b* is also known, so the compiler knows that compute instruction 555*d* may start after instruction 555*b*. In this case, the compiler determines a static schedule in which instruction 555*d* starts at cycle c3. Compute instruction 555*d* depends on data brought into the Tile by instruction 555*c*. The duration of instruction 555*c* is known, so the compiler knows that in the static schedule, instruction 555*c* must start at cycle c2 or earlier. This pattern is repeated for pairs of data transfer instructions and compute instructions 555*e-f*, 555*g-h*, 555*i-j*.

For Tile 2, compute instruction 555*l* depends on data from data transfer instruction 555*k*. However, instruction 555*k* does not start immediately at cycle c0. Rather, it has a delayed start at cycle c4. This may be because the data transfer path required by instruction 555*k* is occupied by some other data transfer instruction and is not available until cycle c4. The start time of instruction 555*k* in the static schedule is not determined by run-time arbitration or contention mechanisms for the shared data transfer path. Rather, the compiler knows that the data transfer path is occupied since the compiler knows the start times and durations of all the data transfer instructions, so the compiler simply creates a static schedule in which instruction 555*k* does not start until cycle c4 when the compiler knows the data transfer path will be available. Similarly, data transfer instruction 555*m* has a delayed start time. Perhaps the T2 D pipeline is being used to transfer out the results of computation 555*l* and does not become available until cycle c5.

For Tile 3, computation 555*n* starts immediately at cycle c0. Perhaps the required data was loaded into Tile 3 during some prior phase. Data transfer instructions 555*o* and 555*p* load data for compute instruction 555*q*. They are separated in time, perhaps because different pieces of data were not available or the data transfer paths were not available until those times. As a final example, data transfer instruction 555*r* loads data for compute instruction 555*s*. In the static schedule, the compiler places instruction 555*r* well in advance of when the data is required, but this may be because that is when the data transfer path is available or perhaps the data was transferred out of the sourcing Tile in order to make room in that Tile.

Execution of the instructions according to the static schedule at run-time may be implemented in different ways. In one approach, the computer program includes an express schedule for the execution of the instructions. Continuing the example of FIG. 5C, the computer program may specify that instruction 555*a* executes at cycle c0, instruction 555*b* at cycle c1, instruction 555*c* at cycle c2, etc. Alternatively, the compiler may fill each instruction stream with NO-OPs to achieve the correct timing. A NO-OP (no operation) is an instruction that occupies a certain number of cycles without other activity. For example, the compiler knows that instruction 555*a* will end at cycle c1 and instruction 555*b* is supposed to begin at cycle c1. It may fill the space between cycles c0 and c1 with NO-OPs for the T1 C pipeline. The T1 C pipeline then just continuously executes instructions from its queue, and the NO-OPs ensure that instruction 555*b* is executed according to the compiler's static schedule. In yet another approach, the static schedule may be implemented by hardware. The T1 C pipeline may just stall on the execution of instruction 555*b* until the data from instruction 555*a* is ready. The compiler knows that data will be ready at cycle c1 and, therefore, instruction 555*b* will execute starting at cycle c1 even though the Tiles are unaware of the static schedule. Regardless of the implementation, for convenience, all of these situations will be described using the phrase "static schedule." Thus, a statement that the compiler statically schedules the instructions is intended to include all of the above implementations and is not meant to imply that the computer program expressly includes a scheduled time for each instruction.

In order to statically schedule the instructions, the compiler typically will know the duration of each instruction (i.e., how long each instruction takes to execute), the capabilities of each Tile (which Tiles can execute which instructions), the topology of data transfer paths to and from Tiles (including between Tiles, and between Tiles and on-chip memory), and the computations required and their dependencies (i.e., the MLN description). With this information, the compiler can schedule unconditional start times for the Tile instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided.

The static schedule of FIG. 5C occurs within the computing mesh 599. The compiler assumes that instructions executed according to the static schedule have been fetched from the off-chip memory 560 in time for their execution, for example, that compute instruction 555*b* has been fetched from off-chip memory by cycle c1, and compute instruction 555*d* has been fetched by cycle c3. Similarly, the compiler also assumes that data used by instructions of the static schedule have also been retrieved from the off-chip memory 560 in time for their consumption. For example, if the data for data transfer instruction 555*a* is coming from off-chip memory, then it has been transferred to the relevant SE or PE by cycle c0, so it can then be transferred by instruction 555*a* to Tile 1. Similarly, the data for data transfer instruction 555*c* has been transferred to the relevant SE or PE by cycle c2.

Figure 6:
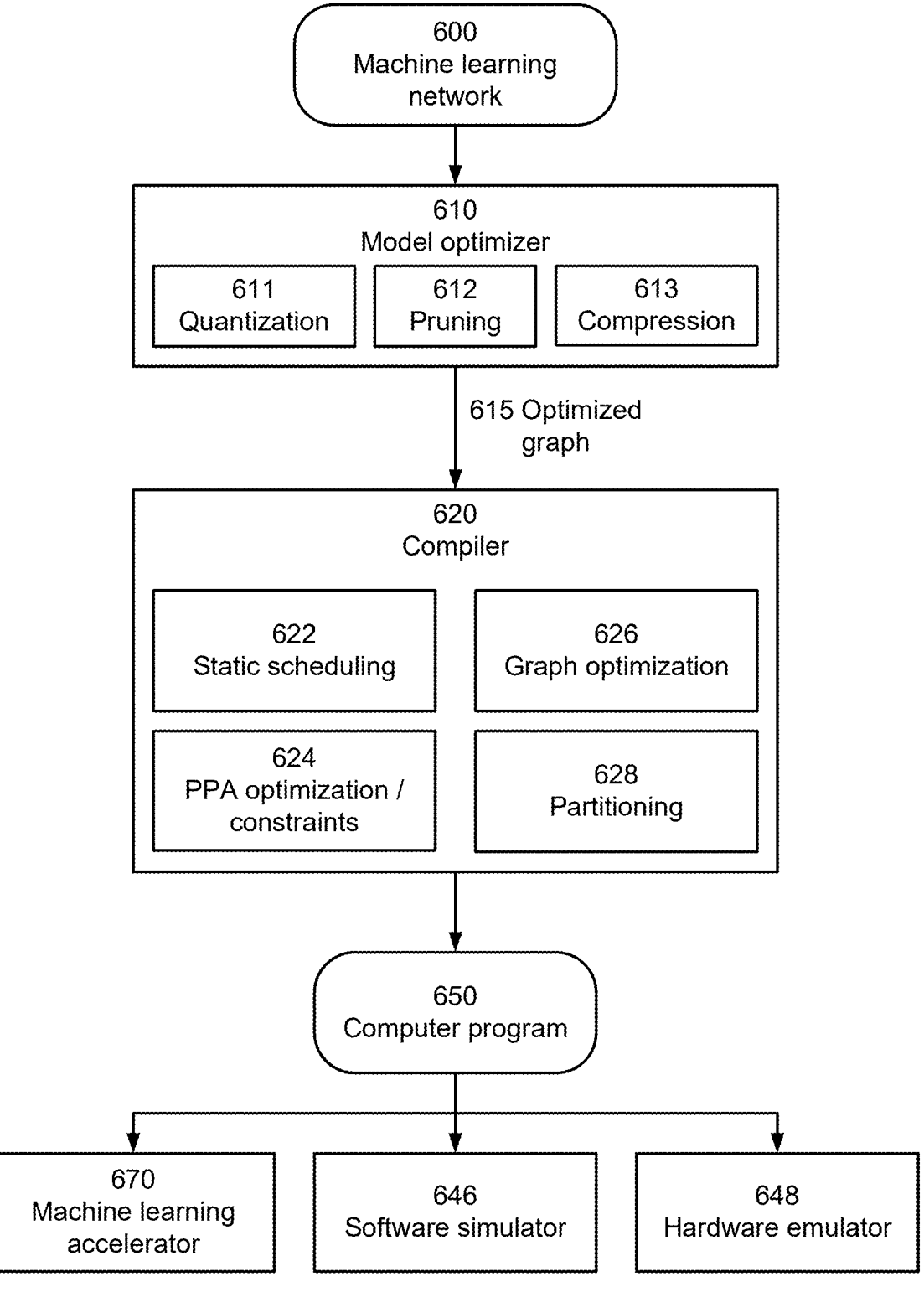
FIG. 6 is a block diagram of a software development environment including a machine learning (ML) compiler.

FIG. 6 is a block diagram of a software development environment including a machine learning (ML) compiler 620. In this example, the software development environment also includes a model optimizer 610. The model optimizer 610 receives a description of the MLN 600 and produces an optimized graph 615 of the MLN. It may apply optimizations such as quantization 611, pruning 612 and/or compression 613. Quantization 611 reduces the resolution of calculated values. For example, floating point values may be quantized to a certain number of bits and then integer math used instead of floating point math. This reduces the complexity and power consumed by the Tiles. Pruning 612 removes parts of the MLN that do not contribute significantly to the overall results. For example, if certain weights are zero or close to zero, those weighted interconnects may be pruned. Finally, because MLNs contain a large amount of data, compression may be used successfully to reduce data transfer bandwidths.

The resulting optimized description 615 of the MLN may be expressed as a graph, in which the nodes of the graph represent nodes in the MLN and the edges of the graph represent the weighted interconnects. The compiler 620 receives the optimized graph 615 and produces the resulting computer program 650. The compiler 620 may perform operations including static scheduling 622, PPA (power performance area) optimizations 624, graph optimizations 626 and/or partitioning 628.

In order to statically schedule 622 the deterministic instructions, the compiler typically will know the duration of each instruction (i.e., how long each instruction takes to execute), the capabilities of each element (which processing elements and storage elements can execute which instructions), the topology of data transfer paths to and from Tiles (including between Tiles, and between Tiles and on-chip memory), and the computations required and their dependencies (i.e., the MLN description). With this information, the compiler can schedule unconditional start times for the deterministic instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided.

PPA optimization 624 includes different optimizations of the computer program 650. For example, the allocation of MLN computations to Tiles may be optimized to reduce power consumption, to increase performance (such as reducing latency or increasing throughput) and/or to reduce area (e.g., number of Tiles used). The compiler 620 may also optimize 624 the computer program 650, subject to constraints on power, performance, area and/or any of the quantities described above. Graph optimization 626 includes analysis of the graph representing the MLN to prune, merge or quantize links, parameters, values, and layers to achieve better performance. Partitioning 628 concerns mapping the computations in the MLN to an implementation on the MLA. This includes determining which computations are allocated to which Tiles and how data flows through the mesh of Tiles during computation. If there are multiple mosaics, it also includes determining which computations are allocated to which mosaics.

The resulting computer program 650 may be loaded into memory for execution on a machine learning accelerator 670. For example, one possible application is object detection. In this case, the inputs are images captured by a video camera. The MLN 600 has been trained to identify certain objects in the video images. The computer program 650 implementing the MLN is loaded onto memory that is accessible by the MLA 670, which is implemented as a chip inside the camera. This way, images captured by the video camera may be immediately analyzed by the computer program 650 running on the MLA 670.

In addition to the MLA 670, the computer program 650 or parts of it may be run on a software simulator 646 and/or hardware emulator 648 (including FPGAs configured as MLAs). These may be used for product development, debugging and/or prototyping. For some purposes, a full simulation or emulation is not necessary. For example, to check that there are no collisions or conflicts between statically scheduled instructions, only the flow of data may be simulated or emulated. It is not necessary to compute actual values.

Figure 7:
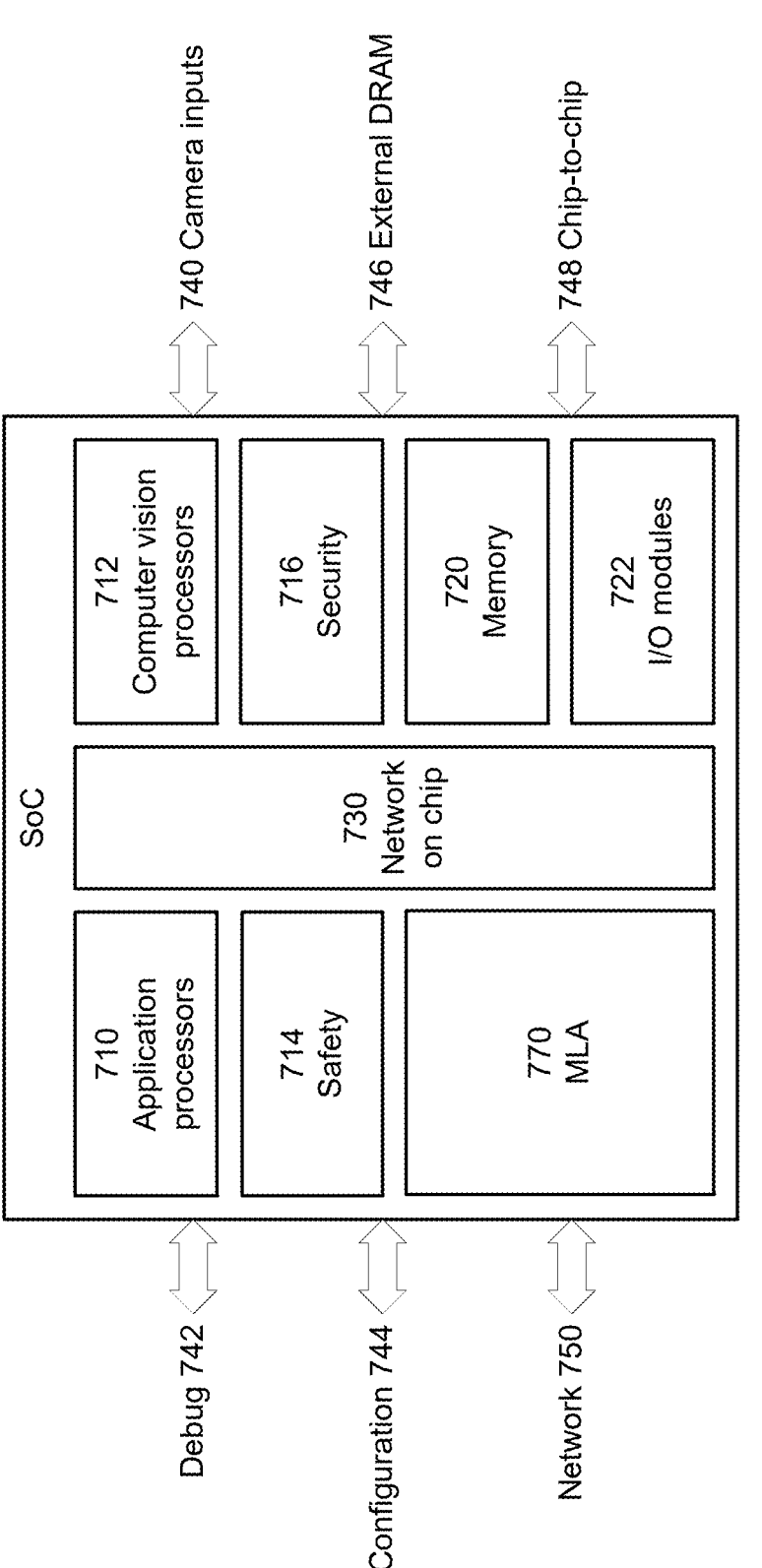
FIG. 7 is a block diagram of an integrated circuit that includes an MLA.

As discussed above, the MLA includes various components that are on the same die. The MLA may be integrated into a larger integrated circuit product (e.g., as part of an edge device). FIG. 7 is a block diagram of an integrated circuit that includes an MLA 770. Other components may be included on the same die as the MLA. This example includes the following additional blocks: application processor 710 (e.g., general purpose CPU running applications), computer vision processor 712 (or other types of application-specific processors), safety 714, security 716, additional SRAM (memory) 720 and input/output circuitry 722. It also includes a network 730 for communication between the different components. This type of semiconductor chip may be referred to as a system-on-chip (SoC).

The connections to the external world include camera inputs 740 for the computer vision processors, ports for debug 742 and configuration 744, a connection 746 to external memory (e.g., DRAM), chip-to-chip connections 748, and network connections 750 (e.g., Ethernet and PCIe).

The SoC of FIG. 7 may be combined with other components to perform various tasks in edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time.

In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. For example, image samples may be input to the computer vision processors 712, which perform initial operations such as edge detection and enhancement, contrast enhancement, motion detection, and optical flow. Raw and/or processed images may be then input to the MLA 770 for analysis by the machine learning network. The MLA may also receive other inputs, such as metadata from other sources and data from other sensors. The application processors 710 may also perform various functions in the overall pipeline and may also serve as a master controller that coordinates operation of the MLA and the other programmable processors in the pipeline.

Edge devices may be portable with less power available for computations compared to, for example, cloud-based server farms. It may also be desirable for the computing pipeline within the edge device to perform tasks without utilizing cloud-based or other remote compute resources. In some implementations, the MLA implements computations in the machine learning network at a speed of at least 50 TOPs (50 trillion operations per second) at a power consumption of not more than 5 watts. The speed may be increased by increasing the number of Tiles in the mesh or the number of Tile meshes on the die.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A machine learning accelerator (MLA) implemented on a semiconductor die, the MLA comprising:
    a plurality of interconnected compute elements configured to execute instructions according to a static schedule clocked by a clock, wherein the compute elements include monitor circuits that generate activity metrics for the compute elements based on instruction types of the instructions executed by the compute elements;
    aggregator logic coupled to the monitor circuits, wherein the aggregator logic receives the activity metrics and generates an aggregate activity metric from the received activity metrics; and
    a clock controller coupled to the aggregator logic, wherein the clock controller adjusts the clock based on the aggregate activity metric and the clock controller reduces an effective clock frequency of the clock for higher aggregate activity levels of the compute elements.

2. The MLA of claim 1, wherein the activity metrics and the aggregate activity metric are indicative of current consumption.

3. The MLA of claim 1; wherein the monitor circuits, the aggregator logic and the clock controller are all implemented as digital circuitry; the compute elements also include execution units that execute the instructions and instructions are transferred in parallel to the execution units and to the monitor circuits; and the instructions implement a machine learning network.

4. The MLA of claim 1, wherein each compute element includes a dedicated monitor circuit that generates the activity metric for that compute element based on the instructions executed by that compute element.

5. A machine learning accelerator (MLA) implemented on a semiconductor die, the MLA comprising:
    a plurality of interconnected compute elements configured to execute instructions according to a static schedule clocked by a clock, wherein the compute elements include monitor circuits that generate activity metrics for the compute elements based on instruction types of the instructions executed by the compute elements and the activity metrics are single-bit flags for different activity levels;
    aggregator logic coupled to the monitor circuits, wherein the aggregator logic receives the activity metrics and generates an aggregate activity metric from the received activity metrics; and

a clock controller coupled to the aggregator logic, wherein the clock controller adjusts the clock based on the aggregate activity metric.

6. The MLA of claim 5, wherein the monitor circuits include lookup tables that convert instruction types to activity levels based on current consumption of different instruction types, and the activity metrics are generated based on the activity levels.

7. The MLA of claim 5, wherein the monitor circuits aggregate multiple single-bit flags for a lower activity level into a single-bit flag for a higher activity level.

8. The MLA of claim 1, wherein the activity metrics are bit-level signals.

9. The MLA of claim 1, wherein the aggregate activity metric includes (a) a composite activity metric (CAM) that is indicative of an aggregate current consumption of the compute elements, and (b) a difference composite activity metric (dCAM) that is indicative of a rate of change of the aggregate current consumption of the compute elements.

10. The MLA of claim 5, wherein the activity metrics are single-bit flags for different levels of current consumption, and the aggregator logic aggregates the single-bit flags from the compute elements and generates a composite activity metric as a weighted combination of the aggregated single-bit flags.

11. The MLA of claim 1, wherein the clock controller adjusts the clock as a function of a rate of change of an aggregate activity level of the compute elements.

12. The MLA of claim 11, wherein the clock controller includes a programmable lookup table that converts a difference composite activity metric (dCAM) to an effective clock frequency (EF) for the clock, wherein the dCAM is indicative of a rate of change of the aggregate activity level of the compute elements.

13. The MLA of claim 5, wherein the clock controller reduces an effective clock frequency of the clock, when a rate of change of the aggregate activity level of the compute elements exceeds a threshold.

14. The MLA of claim 13, wherein the clock controller ramps down and then ramps up the effective clock frequency, when the rate of change of the aggregate activity level exceeds the threshold.

15. The MLA of claim 5, wherein the clock controller reduces an effective clock frequency of the clock, when an aggregate activity level of the compute elements exceeds a threshold.

16. The MLA of claim 1, wherein the aggregate activity metric includes (a) a composite activity metric (CAM) that is indicative of an aggregate current consumption of the compute elements, and (b) a difference composite activity metric (dCAM) that is indicative of a rate of change of the aggregate current consumption of the compute elements; and the clock controller comprises:
    a first branch that filters the dCAM and converts the filtered dCAM to a first effective clock frequency (EF1.1) for the clock;
    a second branch that reduces a second effective clock frequency (EF1.2) of the clock, when the dCAM exceeds a slope threshold;
    a third branch that filters the CAM and reduces a third effective clock frequency (EF2) of the clock, when the filtered CAM exceeds a power threshold; and
    selection logic that generates a final effective frequency of the clock, by selecting a lower of EF1.1 and EF1.2, and further reducing that by a reduction due to EF2 if any.

17. The MLA of claim 1, wherein the clock controller adjusts the clock by chopping the clock cycles.

18. The MLA of claim 5, wherein the clock controller adjusts the clock as a function of a rate of change of an aggregate activity level of the compute elements.

19. The MLA of claim 18, wherein the clock controller includes a programmable lookup table that converts a difference composite activity metric (dCAM) to an effective clock frequency (EF) for the clock, wherein the dCAM is indicative of a rate of change of the aggregate activity level of the compute elements.

20. A method for adjusting a clock used to clock instructions executed by a plurality of interconnected compute elements according to a static schedule, the method comprising:

generating activity metrics for the compute elements based on instruction types of the instructions executed by the compute elements, wherein the activity metrics are single-bit flags for different activity levels;

generating an aggregate activity metric from the activity metrics for the compute elements; and adjusting the clock based on the aggregate activity metric.

\* \* \* \* \*